(No Model.)
J. GOLDSTEIN.
SIFTER FOR FLOUR, &c.
No. 342,597. Patented May 25, 1886.
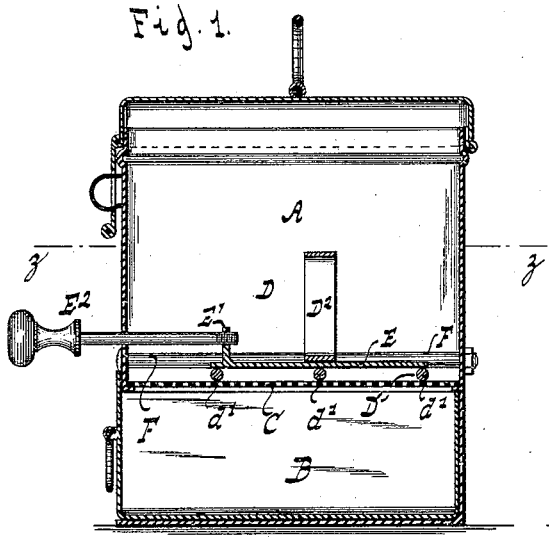
Fig. 1.
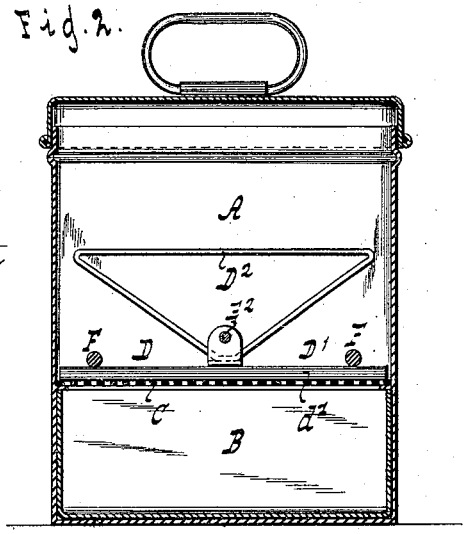
Fig. 2.
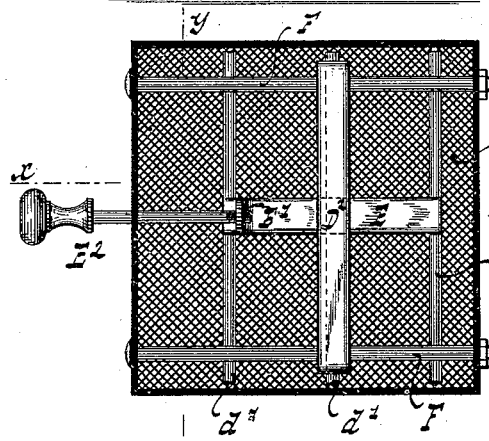
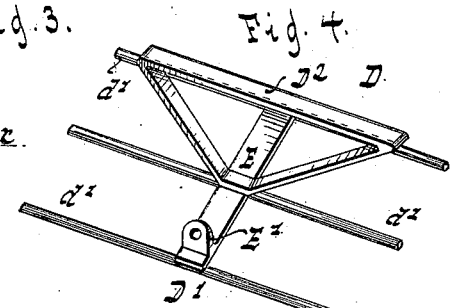
Fig. 3. Fig. 4.
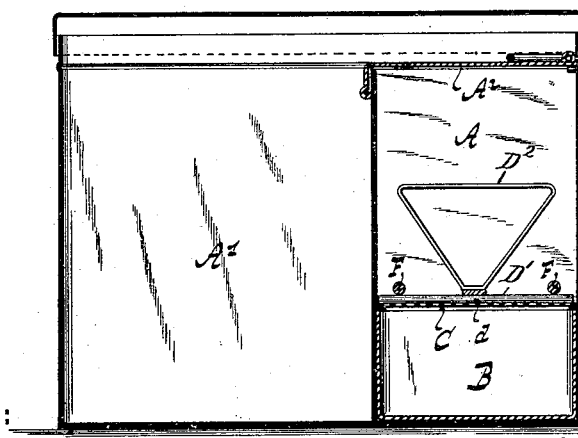
Fig. 5.
WITNESSES:
A. Faber du Faur
William Miller
INVENTOR
Jacob Goldstein
BY
Van Santvoord & Hauff
his ATTORNEYS
N. PETERS, Photo-Lithographer, Washington, D. C.

UNITED STATES PATENT OFFICE.

JACOB GOLDSTEIN, OF NEW YORK, N. Y.

SIFTER FOR FLOUR, &c.

SPECIFICATION forming part of Letters Patent No. 342,597, dated May 25, 1886.

Application filed February 18, 1886. Serial No. 192,426. (No model.)

*To all whom it may concern:*

Be it known that I, JACOB GOLDSTEIN, a citizen of Russia, residing at New York, in the county and State of New York, have invented new and useful Improvements in Sifters for Flour and other Substances, of which the following is a specification.

This invention has for its object to provide a novel sifter for flour and other substances; and it consists in the construction and combination of devices hereinafter described and claimed, reference being made to the accompanying drawings, in which—

Figure 1 is a vertical section in the plane $x$ $x$, Fig. 3, of a flour-sifter embodying my invention. Fig. 2 is a vertical section thereof in the plane $y$ $y$, Fig. 3. Fig. 3 is a horizontal section in the plane $z$ $z$, Fig. 1. Fig. 4 is a perspective view of the agitator. Fig. 5 is a vertical section of my flour-sifter as arranged in a cabinet.

Similars letters indicate corresponding parts.

In the drawings, the letter A designates the casing of the flour-sifter, one side of which is open at its bottom for the introduction of a drawer or tray, B.

C is the screen, which is rigidly secured in the casing A, and D is the agitator, which consists of a grating and what I shall term the "stirrer" $D^2$. The grating consists of a number of parallel bars, $d'$, which extend almost across the screen, and are united by a traverser, E, which is provided with an upwardly-extending lug, E', to which is attached a handle, $E^2$. This handle $E^2$ extends through the front of the casing, and serves to move the grating over the screen. To hold the grating down on the screen, two guide-bars, F, are employed, which extend across the casing in the proper position.

The stirrer $D^2$ in the example shown in the drawings consists of a triangular-shaped frame, which is attached to the traverser E, and moves with the grating in a direction at right angles to its length. The stirrer $D^2$ projects upward to a considerable height, so that it operates upon the bulk of flour or other material to be sifted, and thoroughly breaks up all the lumps and other obstructions which would impede the action of the agitator, while at the same time it prevents the material operated upon from caking or forming in a solid mass above the screen.

In Fig. 5 I have shown my flour-sifter as occupying one compartment of a cabinet, the other compartment, A', being designed for bread or a supply of flour. In this case the casing for the flour-sifter is provided with an independent cover, $A^2$.

In the example shown in the drawings a square casing and screen are employed, and a reciprocating motion is imparted to the agitator; but it is evident that a circular casing and screen can be employed, and the agitator constructed of precisely the same elements, but in such a shape that it can be rotated.

What I claim as new, and desire to secure by Letters Patent, is—

1. The combination of the casing, the screen, the grating comprising bars $d'$, the traverser E, connecting the bars, the stirrer-frame $D^2$, secured to and rising from the traverser, and a handle for moving the grating over the screen, substantially as described.

2. The combination, with a casing and a screen therein, of the grating D', movable on the screen, the stirrer $D^2$, projecting upward from said grating, the guide-bars F, and means, substantially as described, for imparting motion to the grating.

3. The combination, with the casing and a screen therein, of the bars $d'$, arranged on the screen, the traverser E, uniting said bars to form a grating, the handle $E^2$, the stirrer $D^2$, secured to the grating and extending upward therefrom, and the guide-bars F, substantially as set forth.

In testimony whereof I have hereunto set my hand and seal in the presence of two subscribing witnesses.

JACOB GOLDSTEIN. [L. S.]

Witnesses:
W. HAUFF,
E. F. KASTENHUBER.